United States Patent [19]

Riedl

[11] Patent Number: 4,849,634
[45] Date of Patent: Jul. 18, 1989

[54] MODULATION DEVICE

[75] Inventor: Gunther Riedl, Egling, Fed. Rep. of Germany

[73] Assignee: Messerschmitt-Bölkow-Blohm GmbH, Munich, Fed. Rep. of Germany

[21] Appl. No.: 164,537

[22] Filed: Mar. 7, 1988

[30] Foreign Application Priority Data

Mar. 19, 1987 [DE] Fed. Rep. of Germany ....... 3708923

[51] Int. Cl.[4] .............................................. G01J 5/62
[52] U.S. Cl. .................................. 250/332; 250/330; 250/342; 250/350; 250/351
[58] Field of Search ............. 250/351, 350, 334, 332, 250/330, 342, 233; 350/273, 274

[56] References Cited

U.S. PATENT DOCUMENTS 3,444,380 5/1969 Webb ................................. 250/209
3,853,405 12/1974 Adler et al. ......................... 356/152

FOREIGN PATENT DOCUMENTS 2715997 8/1978 Fed. Rep. of Germany ...... 250/332
2722018 11/1978 Fed. Rep. of Germany .

Primary Examiner—Janice A. Howell
Assistant Examiner—Constantine Hannaher
Attorney, Agent, or Firm—Kenyon & Kenyon

[57] ABSTRACT

The disclosure is directed to a modulation device for a radiation detector device picking up an image field. The modulation device comprises a modulation disk disposed in the image field plane and having radial slits, said modulation disk executing a nutation about the axis of the image field. The modulation device further includes an optical system, a radiation-sensitive receiver arrangement and a signal processor. The radiation-sensitive receiver arrangement (11) comprises a grouping of radiation reception elements (E11 to Emm) forming a radiation receiver field (13), which elements are coupled with a window circuit (18, 22, 32) and are selectively addressable by the window circuit for the formation of at least one window zone within the radiation receiver field (13). The addressing occurs such that only signals of this at least one window zone are transmitted into the signal processor.

5 Claims, 2 Drawing Sheets

MODULATION DEVICE

BACKGROUND OF THE INVENTION

The invention relates to a modulation device for a radiation detector device operable to pick up an image field. The modulation device includes a modulation disk having radial slits. The modulation disk is positioned in the plane of the image field. The modulation disk executes a nutation about the axis of the image field, and the modulation device is additionally provided with an optical system, a radiation-sensitive receiver arrangement and a signal processing circuit.

In accordance with a known modulation device, a large-area optoelectronic transducer is utilized as a radiation-sensitive receiver arrangement on which the picked-up image field is projected. This known modulation device makes it possible, in principle, to differentiate radiation sources not of interest from a radiation source to be detected, if the area of the radiation source not of interest is larger than that of the radiation source of interest, which in turn is in the order of magnitude of the slit width of a modulation disk.

By means of the modulation disk, the radiation field present within the image field is frequency-modulated.

The modulation device is used in conjunction with a position-finder and operates as follows:

The radiation of an object is transformed into frequency-modulated electrical signals dependent on the object's position coordinates and is evaluated accordingly in a signal processor. The reference system for the position coordinates is, e.g., the center of the field of view of a seeker.

The radiation-emitting object is projected on or near the modulation disk present in or near the image plane. This modulation disk is provided with radial slits to create a radial pattern having the function of modulating the detected radiation with a position-dependent code.

The radial modulation disk executes a nutation about the image field axis.

On the basis of this nutation, the rays of the beam passing through the disk are modulated with respect to their intensity. At the same time, a modulation of the sequential frequency of the pulses is carried out.

When a picture element of the image field is in the center of the image field, the pulse frequency remains constant, whereas when the picture element lies outside the image field center, a frequency deviation results which is swept at a constant modulation frequency.

The magnitude of the frequency deviation and the phase of the modulation correspond to the coordinates of the radiating object projected in the image field. In this way the movement of such a radiating object can be determined.

From DE-PS No. 27 22 018 it is known to use a liquid crystal diaphragm in the optical equipment to block out interfering radiation while allowing radiation coming from the target of interest to pass through.

Such a variable liquid-crystal diaphragm comprises raster elements arranged in a matrix form and activated by means of an electronic row/column driver. The purpose of this variable liquid crystal diaphragm with the respective electronic controls is to do scans, in addition to pure masking (window formation), or respectively to perform combined masking and scanning controls. Further, this variable liquid-crystal diaphragm permits the combined use of a scanning and masking process. This is important, in particular, when in the visual field of an observation device, several objects appear simultaneously which are to be observed and evaluated successively. In such a case, to facilitate observation of a target object, the object observed before, lying directly next to the latter, must be covered up, as it would otherwise act as an undesired interfering target.

SUMMARY OF THE INVENTION

It is primary objective of the present invention to provide a modulation device of the initially mentioned type including a fast-working radiation-sensitive receiver arrangement of simple design and operable so as not to be susceptible to disturbance, which permits a detection of the radiation object of interest when there are several radiating objects.

This problem is solved according to the invention in that the radiation-sensitive receiver arrangement comprises an array of radiation receiving elements forming a radiation receiver field, which elements are coupled with a window circuit. The radiation receiving elements are selectively addressable by the window circuit for the formation of at least one window zone within the radiation receiver field, in such a way that only signals of this at least one window zone can be transmitted into the signal processor.

This results in the advantage that the radiation receiver arrangement is activated with respect to selected radiation reception elements or radiation receiver groups. Accordingly, no additional controllable diaphragm arrangement is necessary. Advantageously, the radiation receiver arrangement forms a combination of a variable diaphragm and a radiation reception arrangement. The invention, therefore, combines both functional units into a single device. This means that in the new modulation device only those radiation reception elements of a radiation receiver field irradiated by the radiating object of interest are activated and coupled with the signal processor. Thus, there results an advantageous control possibility in the sense that a located radiating object is picked up by windows, with only the respective addresses of the irradiated radiation reception elements being addressed in the radiation receiver arrangement.

The advantage of this is that, with respect to the signals of the irradiated radiation reception elements relayed for further processing, a signal field results which is adapted locally in accordance with the state of this radiation reception field (e.g. moving or immobile). All signals of the signals lying outside the window zone or signal field are either not evaluated or are evaluated separately. Hence, this modulation device functions in the manner of an activated radiation receiver group whose size is adapted to the size of the radiation field in the image field. For a moving radiation field there occurs a correlated and corresponding readjustment of the addresses of the radiation reception elements becoming irradiation-free and of the respective newly irradiated radiation reception elements. The modulation device according to the invention combines in itself the advantages of a variable image field diaphragm and of a sensitive radiation reception and detector device.

Due to the reduction in size of the radiation reception elements, the sensitivity of the modulation device increases, resulting in the further advantage that the range for the detection of radiating objects is increased.

Additional radiating objects lying outside the window field are either not taken into consideration, in that their respective addresses are not activated, or they are sent to a separate evaluation circuit for interference analysis or scene processing.

In accordance with a feature of the present invention, a signal detector circuit is provided which commands the window circuit as a function of found signals of the radiation reception elements satisfying given response criteria to form a signal field automatically for the formation of a window zone, as was set forth at the outset.

The window circuit may comprise, for example, an addressable gate circuit with shift registers.

Advantageously, the signal detector circuit comprises a microcomputer, the read-only memory of which stores data for the work program.

The modulation device according to the invention is advantageously part of an object-locating device, responding to infrared or laser radiation, of, in particular, flying objects emitting infrared or laser radiation.

The temperature resolution of an infrared detector, referred to as NETD, is defined as the temperature difference between two large-area scene elements which generates a signal at the detector output equal to the RMS value of the background noise. We have the equation:

$$NETD = \frac{4'F^2 \cdot \sqrt{\Delta f}}{\sqrt{A_D} \cdot \tau_o \cdot M^*}$$

where

F is the f-number of the lens, f is the noise bandwidth of the instrument, $A_D$ is the area of a radiation reception element, $\tau_O$ is the transmission factor of the lens, and $M^*$ is the quality factor of the radiation reception arrangement.

The temperature resolution is evidently inversely proportional to the root of the area of a radiation reception element.

The element addressing is expediently carried out so that only those elements are addressed on which the radiation source of the object, in particular a missile, is projected. To this end, before the missile is fired, the entire mosaic or radiation receiver field of the radiation reception elements is addressed. Then the zones in which a signal is measured which is greater than the one expected from the missile are excepted from the addressing, as they contain interferences (natural or artificial ones). If a brightness jump of a given magnitude occurs which affects as many radiation reception elements as are, according to experience, illuminated by the missile, this brightness jump is recognized upon entry of the missile in the visual field. Thereafter, the respective detector elements are addressed as a missile window. This window is continuously adapted to the missile size and made to follow as a function of the missile's position. In case of signal loss or touching or crossing of one of the interference zones mentioned above, the position of the missile is estimated by prediction filters until undisturbed measurement values are again present. Simultaneously, the interference zones can be followed up similarly, as is necessary, for movable disturbing sources or a movable sighting line.

In the new modulation device, advantageously, there is no costly bulky mechanism subject to tolerances and to wear. Tracking of disturbing sources is possible, as several windows can be formed simultaneously.

Another advantage is that no liquid-crystal diaphragm is used. Hence, no optical attenuation occurs, as would be present in the crystal layers of the liquid diaphragm. The detector arrangement, on the other hand, is at the end of the respective ray path, so that the thickness of the detector arrangement is of no importance. The position of disturbing source can be determined because an imaging system is provided, even though it is a relatively rough one. With a liquid crystal diaphragm, on the contrary, disturbing sources can be located only with time-consuming search methods. For several small sources simultaneously present, location becomes impossible, since what is determined as an apparent location is the center of gravity. The detector arrangement according to the invention has much fewer picture elements than in an image processing device yet provides at least equally exact position-finding. Large-area sources are suppressed. The cost of signal processing is therefore only a fraction of that for electronic image processing.

The invention will be described below with reference to an embodiment illustrated in FIGS. 1 and 2.

DETAILED DESCRIPTION

Figure 1:
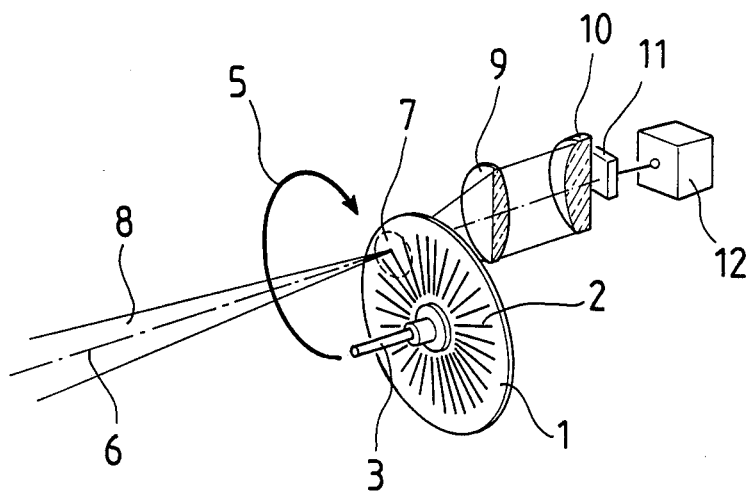
FIG. 1 is a schematic representation of the modulation device according to the present invention.

According to FIG. 1, the reference numeral 1 denotes a modulation disk which is provided with radial slits 2 which give the modulation disk 1 a grid structure. Such a modulation disk 1 is referred to also as reticle disk. This reticle disk 1 is mounted upon an axle 3 and movable on a nutation orbit 5 about the center axis 6 of an image field (not shown). The reference numeral 7 denotes an image, projected on the reticle disk 1, of a radiation source not illustrated, the light beam of which bears the reference symbol 8. The reference numerals 9 and 10 indicate lenses of a so-called relay optical system. A radiation receiver arrangement 11 is located behind the relay optical system 9, 10. The reference numeral 12 designates a signal processing circuit of the light receiver arrangement 11.

Figure 2:
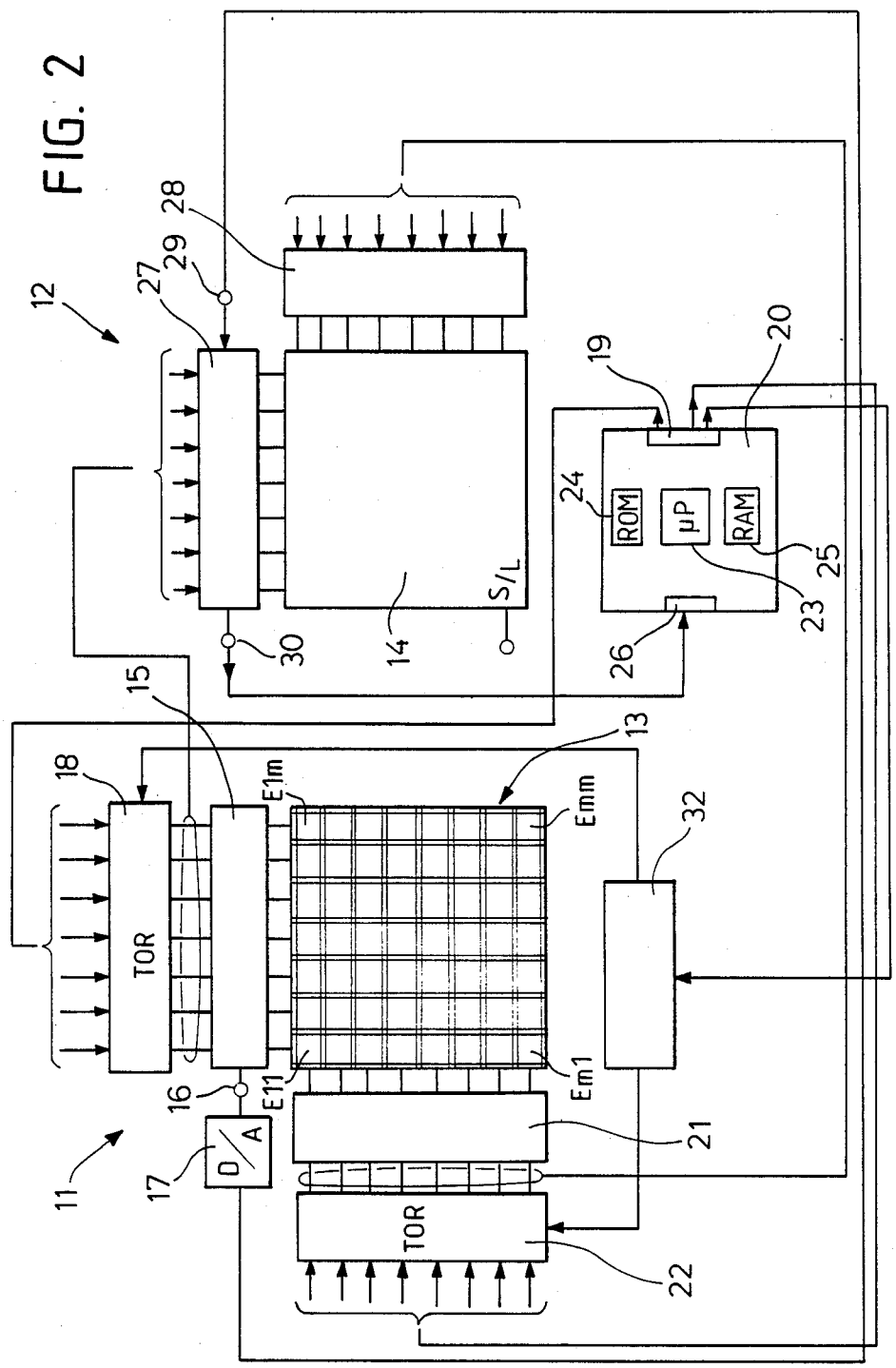
FIG. 2 is a schematic circuit arrangement of the modulation device of FIG. 1.

According to FIG. 2, a photo-receiver array 13 is provided. The photo-receiver 13 comprises individual photo elements Ell, ... Elm, ... Eml, ... Emm. The photo-receiver or photo-element arrangement 13 is made large enough so that the entire image field can be projected on it.

Associated with this photo-element array 13 is a matrix memory 14, which is divided into individual memory fields (not shown), of a number equal to the number of individual photo elements. Both arrangements 13 and 14 may be part of a CCD array. The reference numeral 15 denotes a control circuit which has a serial output 16 connected with an analog/digital converter 17. The control arrangement 15 serves, in addition, as a column control arrangement and is connected with a column gate circuit 18 whose control inputs are connected with an output port 19 of a microcomputer 20. The number of control inputs of the gate circuit 18 corresponds to the number of columns 1 to m of the photo-receiver arrangement 13. By 21 is designated a row control circuit which on the input side is connected with a row gate circuit 22. The inputs of this row gate circuit 22 are also connected to the output stage 19 of the microcomputer 20.

The microcomputer contains a microprocessor 23, a read-only memory 24, a working memory 25, and an input stage 26. The output stage 19 and the input stage 26 are part of an interface circuit.

The memory arrangement 14 associated with the photosensitive receiver array 13 has assigned to it a column control circuit 27 and a row control circuit 28. The column control circuit 27 comprises address control lines which are connected to the address control lines located between the column gate circuit 18 and the column control circuit 15.

The address lines of the row control circuit 28 are connected to the address lines located between the row control circuit 21 and the row gate circuit 22.

The column control circuit 27 of the memory array 14 comprises a serial data input 29 and a serial data output 30. The serial data input of this column control circuit 27 is connected to the output of the analog/digital circuit 17. The data output 30 comprises a control line to the input stage 26 of the microcomputer 20.

The address lines for the window reception field of the light reception array 13 and of the associated memory positions in the memory array 14 are controlled automatically, namely as a function of defined or given criteria of the signal field.

The reference numeral 32 denotes a gate control circuit, the control input of which is connected to the output stage 19 of microcomputer 20. This gate control circuit 32 comprises control lines which are connected to the two gate circuits 18 and 22.

When the modulation device is taken into operation, appropriately first all address lines of the rows and columns are activated by the microcomputer 20. If then, in a manner not shown, it is signaled to the microcomputer 20 that a certain radiating object is to be picked up, there occurs a signal wise pickup of the associated light reception elements of the light reception array 13 and of their addresses with inclusion of the memory array 14. Thereupon the microcomputer 20 causes only those irradiated light reception elements which form a so-called signal window field to be picked up and stored in terms of signals and addresses.

All other light reception elements are not taken into consideration with respect to their signals, which is done in that their address lines are not activated.

Now if the radiating object becomes larger or smaller and also moves within the image field, this is automatically taken into consideration by means of the memory array 14 and of the microcomputer 20. Ultimately this means that the window field in which the irradiated light reception elements are located adapts itself to the particular size and position of the irradiated light reception elements.

In this manner, interference signals and interference sources are eliminated with respect to their influence.

What is claimed is:

1. A modulation device for a radiation detector device receiving an image field, which modulation device comprises
   a modulation disk arranged in the plane of said image field,
   said modulation disk having radial slits,
   said modulation disk executing a nutation about the axis of said image field,
   a radiation-sensitive receiver arrangement,
   an optical system optically coupling said image field to said radiation-sensitive receiver arrangement, and
   a signal processor coupled to said radiation-sensitive receiver arrangement,
   said radiation-sensitive receiver arrangement comprising an array of radiation-receiving elements forming a radiation receiver field,
   said radiation-receiving elements being coupled to a window circuit and selectively addressable by said window circuit for the formation of at least one window zone within said radiation receiver field,
   said at least one window zone comprising preselected ones of the radiation-receiving elements such that only signals from said preselected ones of the radiation-receiving elements of said at least one window zone can be transmitted to said signal processor, whereby said signal processor only processes signals of said preselected ones of the radiation-receiving elements.

2. The modulation device of claim 1, and further a signal detector circuit to detect signals of the radiation-receiving elements (EII to Emm) which correspond to preselected response criteria and form a signal field to automatically regulate said window circuit to define said window zone.

3. The modulation device of either of claims 1 or 2, wherein said window circuit comprises at least one addressable gate circuit including shift registers.

4. The modulation device of claim 2 wherein said signal detector circuit comprises a micro-computer.

5. The modulation device of claim 1 wherein said modulation device is coupled to an object-locating device which device is responsive to infrared or laser radiation emitted by flying objects.

* * * * *